W. G. NEWTON.
COMBINATION HOT AND COLD WATER FAUCET.
APPLICATION FILED JAN. 28, 1916.
1,212,806.
Patented Jan. 16, 1917.
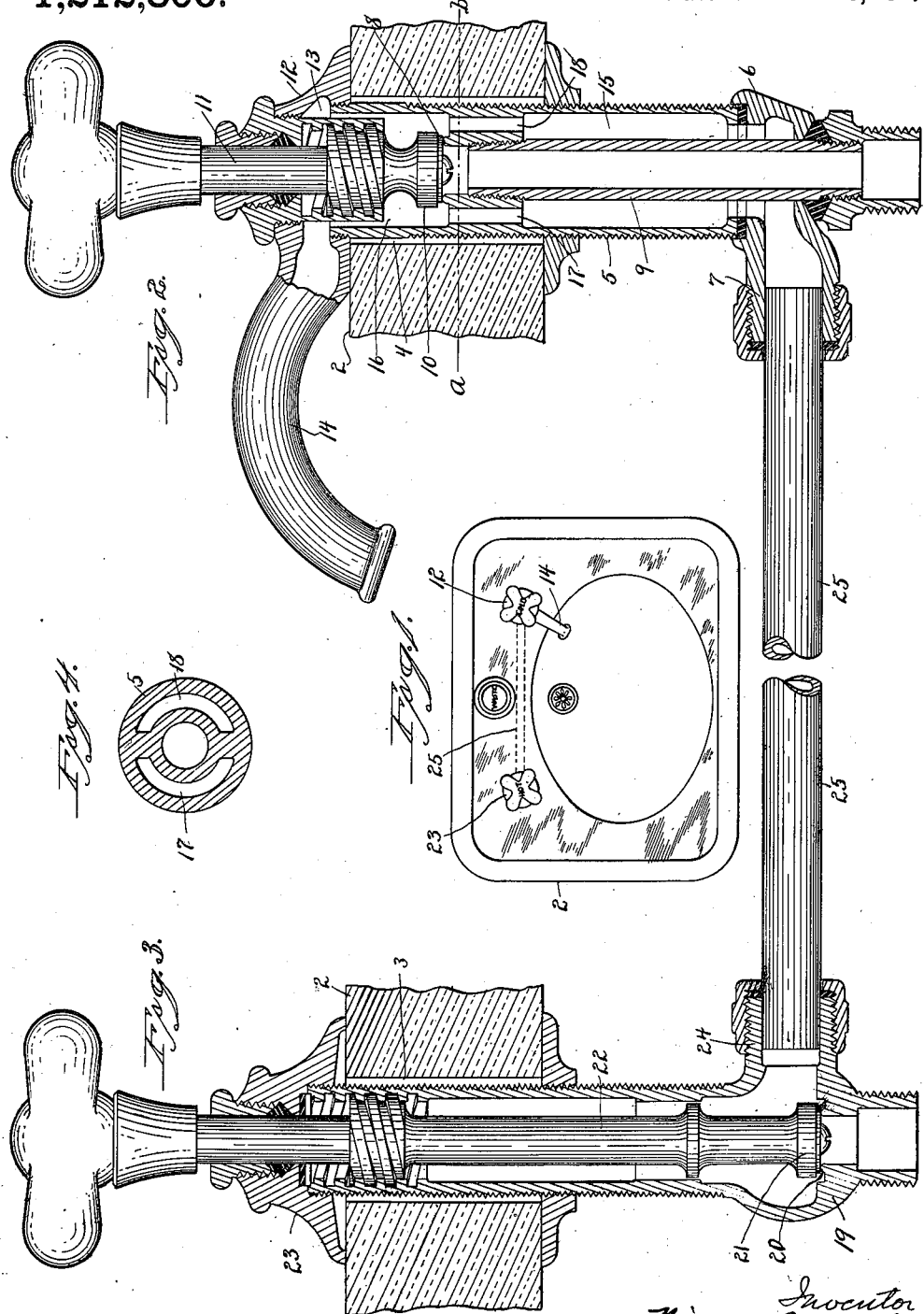

UNITED STATES PATENT OFFICE.

WILLIAM G. NEWTON, OF NEW HAVEN, CONNECTICUT, ASSIGNOR TO THE PECK BROS. & CO., OF NEW HAVEN, CONNECTICUT, A CORPORATION.

COMBINATION HOT AND COLD WATER FAUCET.

1,212,806.   Specification of Letters Patent.   Patented Jan. 16, 1917.

Application filed January 28, 1916. Serial No. 74,723.

*To all whom it may concern:*

Be it known that I, WILLIAM G. NEWTON, a citizen of the United States, residing at New Haven, in the county of New Haven and State of Connecticut, have invented a new and useful Improvement in Combination Hot and Cold Water Faucets; and I do hereby declare the following, when taken in connection with the accompanying drawings and the characters of reference marked thereon, to be a full, clear, and exact description of the same, and which said drawings constitute part of this application, and represent, in—

Figure 1 a plan view of a basin equipped with a combination faucet constructed in accordance with my invention. Fig. 2 a view partly in section, and partly in side elevation of my improved combination faucet. Fig. 3 a side view, partly in section, of the controlling valve for the other supply pipe. Fig. 4 a sectional view on the line *a—b* of Fig. 2.

This invention relates to an improvement in combination hot and cold water faucets. The advantages of having hot and cold water both discharge from a single faucet are well known, but in equipping wash basins with a single discharge faucet for hot and cold water, specially formed basin slabs must be employed, and such combination faucets usually require a special style of waste-operating mechanism.

The object of this invention is to provide a combination faucet which may be applied to any basin equipped with faucet openings, and which can be used with any style of slab; and the invention consists in the construction hereinafter described and particularly recited in the claims.

In carrying out my invention, the slab 2, is of any approved design having faucet openings 3 and 4. In one of the openings, as 3, I mount my combined hot and cold water faucet which consists of a suitable outer casing 5 connected at its lower end with a coupling-piece 6 to which one of the supply pipes, as for cold water, is attached. This coupling-piece is also formed with a sidewise projecting nipple 7 for the purpose as will hereinafter appear. This casing is formed near its upper end with a valve seat 8. This valve seat is connected with the cold water supply pipe with a coupling tube 9, and to close the upper end of this tube I employ the usual gate 10 operated by a valve spindle 11 projecting through the head 12 in the usual manner of faucets, the head 12 being formed with the usual chamber 13 which communicates with the discharge nozzle 14. The valve seat 8 separates the casing 4 into a lower chamber 15, and an upper or mixing chamber 16, and these are connected by ports 17 and 18 formed through the valve seat 8. The other inlet pipe, as for hot water, is connected with the usual form of valve casing 19 formed with a seat 20 which is closed by a gate 21 operated by a long spindle 22 extending upward through a cap or head 23 mounted on the top of the basin at the side opposite the faucet and at the point usually occupied by a single faucet. The valve 19 has a nipple 24 at one side, and the nipple 24 and the nipple 7 are connected by a transfer pipe 25 so that when the gate 21 is open, hot water may pass to the chamber 15 upward through the ports 17 and 18 to the mixing chamber 16 and escape through the nozzle 14. Cold water is admitted by opening the gate 10 which allows cold water to escape through the nozzle. The supply of water is tempered by opening one or the other of the gates as the case may be, to allow more or less of hot or cold water to be discharged. With this construction the discharge faucet is at one side of the basin instead of at the center; but the advantages of having both hot and cold water discharged from a single faucet are secured and any basin may be readily equipped with a combination faucet irrespective of the style of waste employed, and irrespective of the location of the faucet openings as the transfer pipe 25 may be made longer or shorter as the case may be or it may be bowed around the waste pipe or waste-operating mechanism which may be in a way of a straight line between the nipples 24 and 7. If the gate 10 is open cold water only will be discharged; or if the gate 21 is opened only hot water will be discharged.

While I have referred to the use of hot and cold water coming from the respective supply pipes, it is obvious that the connections with hot and cold water may be reversed as the combination faucet may be arranged at either side of the basin as is most convenient. In describing my invention I have omitted reference to the usual packings and stuffing boxes which are commonly employed in basin faucets.

I claim:—

1. A valve-outfit for wash basins, comprising two independently organized vertically arranged valve-structures respectively adapted to be connected at their lower ends with a hot and a cold water supply-pipe and one having a single nozzle, and each having an independently operable valve closing against the pressure of the water, and the said valve-outfit also comprising a water-pipe leading from one valve-structure into the other, whereby water may be drawn through the said nozzle from either valve-structure by operating its particular valve, or through the said nozzle from both valve-structures by operating both valves.

2. A valve-outfit for wash-basins, comprising two independently organized valve-structures one of which is nozzleless and furnished with a long valve-stem provided at its lower end with a valve closing against the water-pressure, and the other having two independent water-passages, a single nozzle communicating with both of the said passages, and a valve closing against the water-pressure, and the two structures being connected by a water-pipe one end of which is connected with the nozzleless structure at a point above the valve thereof, and the other end of which is connected with the other structure so as to lead into one of the water-passages thereof at a point below the valve of the said structure, whereby water may be drawn through the nozzle from either structure or simultaneously from both structures.

3. A valve-outfit for wash basins, comprising two independently organized valve structures having independent manually operable valves, one structure being nozzleless and the other structure having a nozzle and two independent concentric water-passages the upper ends of which communicate with the said nozzle, and the nozzleless structure being connected at its lower end by a pipe with the outer water-passage of the other structure, whereby water may be drawn through the nozzle from either structure or simultaneously from both structures.

4. The combination with a wash-basin slab having two faucet-openings, of two independently organized vertically arranged valve-structures mounted in the said openings and respectively adapted to be connected at their lower ends with hot and cold water supply pipes, and one of such structures having a single nozzle and each structure having an independently operable valve for controlling the water admitted through its supply-pipe and both of the said valves closing against the pressure of the water; and a water pipe located below the said slab and leading from the nozzleless structure to the structure having a nozzle, whereby water may be drawn through the said nozzle from either valve-structure by operating its particular valve or simultaneously from both valve-structures by operating both valves.

WILLIAM G. NEWTON.